US009858585B2

(12) United States Patent
Abuelsaad et al.

(10) Patent No.: US 9,858,585 B2
(45) Date of Patent: Jan. 2, 2018

(54) ENHANCING DATA CUBES

(71) Applicant: INTERNATIONAL BUSINESS MACHINES CORPORATION, Armonk, NY (US)

(72) Inventors: Tamer E. Abuelsaad, Somers, NY (US); Gregory J. Boss, Saginaw, MI (US); John M. Ganci, Jr., Cary, NC (US); Craig M. Trim, Sylmar, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 637 days.

(21) Appl. No.: 14/537,945

(22) Filed: Nov. 11, 2014

(65) Prior Publication Data
US 2016/0132914 A1 May 12, 2016

(51) Int. Cl.
G06Q 10/06 (2012.01)
G06N 5/04 (2006.01)
(Continued)

(52) U.S. Cl.
CPC ........... *G06Q 30/0206* (2013.01); *G06N 5/04* (2013.01); *G06Q 10/06* (2013.01); *G06Q 30/0623* (2013.01)

(58) Field of Classification Search
USPC ........................................................ 705/7.35
See application file for complete search history.

(56) References Cited

U.S. PATENT DOCUMENTS 5,271,453 A * 12/1993 Yoshida ............. G05B 19/0421
165/205
6,970,874 B2  11/2005 Egilsson et al.
(Continued)

FOREIGN PATENT DOCUMENTS

WO      0002141 A1   1/2000
WO  2008008213 A2   1/2008

OTHER PUBLICATIONS

Li et al., The Journal of Systems and Software 82 (2009) 241-252, "A study of project selection and feature weighting for analogy based software cost estimation", Available online Jun. 17, 2008 at Science Direct).*

(Continued)

*Primary Examiner* — Ivan R Goldberg
*Assistant Examiner* — Matthew D Henry
(74) *Attorney, Agent, or Firm* — Garg Law Firm, PLLC; Rakesh Garg; Christopher K. McLane

(57) ABSTRACT

A data server receives multiple requests for data cubes that include data related to a user-specified subject matter. The requests are aggregated into an aggregated request, and an initial data cube is retrieved based on the aggregated request. Upon determining that the initial data cube fails to provide requisite data needed by the aggregated request due to data being missing from the initial data cube, the missing data is located and identified as augmentation data. The initial data cube and the augmentation data are sent to senders of the multiple requests for data cubes. In response to a new request, from a new requester, for a data cube that provides data related to the user-specified subject matter, the data server presents the new requester with an option to purchase the initial data cube at a first price and the augmentation data at a second price.

12 Claims, 3 Drawing Sheets

(51) Int. Cl.
*G06Q 30/02* (2012.01)
*G06Q 30/06* (2012.01)

(56) References Cited

U.S. PATENT DOCUMENTS

| | | | | |
|---|---|---|---|---|
| 7,379,884 | B2* | 5/2008 | Barsness | G06F 9/5072 |
| | | | | 705/63 |
| 7,454,410 | B2 | 11/2008 | Squillante et al. | |
| 7,630,986 | B1* | 12/2009 | Herz | G06Q 10/10 |
| 7,761,313 | B1* | 7/2010 | Brown | G06Q 30/02 |
| | | | | 705/4 |
| 8,285,703 | B1 | 10/2012 | Wagers | |
| 8,381,120 | B2 | 2/2013 | Stibel et al. | |
| 2003/0009263 | A1* | 1/2003 | Watkins | H05B 37/02 |
| | | | | 700/275 |
| 2004/0176969 | A1* | 9/2004 | Fujinuma | G06Q 10/02 |
| | | | | 705/5 |
| 2005/0046375 | A1* | 3/2005 | Maslov | B60L 8/00 |
| | | | | 318/650 |
| 2005/0160409 | A1* | 7/2005 | Schmid-Lutz | G06F 8/41 |
| | | | | 717/140 |
| 2006/0041537 | A1* | 2/2006 | Ahmed | G06F 17/3097 |
| 2006/0095518 | A1* | 5/2006 | Davis | H04L 67/125 |
| | | | | 709/206 |
| 2009/0138458 | A1* | 5/2009 | Wanker | G06F 17/30864 |
| 2009/0144066 | A1* | 6/2009 | Van Luchene | G06Q 10/067 |
| | | | | 705/348 |
| 2009/0183151 | A1* | 7/2009 | Gharabally | G06F 8/61 |
| | | | | 717/178 |
| 2011/0093371 | A1* | 4/2011 | Clemm | G06Q 30/0207 |
| | | | | 705/34 |
| 2011/0106831 | A1* | 5/2011 | Zarzar Charur | G06F 17/3064 |
| | | | | 707/767 |
| 2011/0264291 | A1* | 10/2011 | Le Roux | G06Q 10/06 |
| | | | | 700/291 |
| 2012/0158536 | A1* | 6/2012 | Gratton | G06F 30/0631 |
| | | | | 705/26.7 |
| 2012/0166284 | A1* | 6/2012 | Tseng | G06F 30/0273 |
| | | | | 705/14.58 |
| 2012/0253527 | A1* | 10/2012 | Hietala | G05B 17/02 |
| | | | | 700/278 |
| 2012/0254000 | A1* | 10/2012 | Ryzhikov | G06Q 10/00 |
| | | | | 705/34 |
| 2012/0259687 | A1* | 10/2012 | Kajamohideen | G06Q 30/0601 |
| | | | | 705/14.23 |
| 2013/0013338 | A1* | 1/2013 | DeBelser | A61M 5/16831 |
| | | | | 705/2 |
| 2013/0197699 | A1* | 8/2013 | Gyota | F24F 11/006 |
| | | | | 700/276 |
| 2013/0238387 | A1 | 9/2013 | Stibel et al. | |
| 2013/0246336 | A1 | 9/2013 | Ahuja et al. | |
| 2013/0325870 | A1* | 12/2013 | Rouse | G06F 17/30707 |
| | | | | 707/741 |
| 2014/0052750 | A1* | 2/2014 | Ciabrini | G06Q 10/02 |
| | | | | 707/769 |

OTHER PUBLICATIONS

C. Ballard et al., "Enabling Robust Business Analytics with InfoSphere Warehouse Cubing Services", IBM Corporation, 2009, pp. 1-34.
M. Depalma, "System, Method or Apparatus for Exchanging Knowledge, Information, Products or Any Entity(ies) of Value, and Real Time Market and/or Individual Sensitive or Responsive System of Education", IPCOM, ip.com, IPCOM000177786D, Jan. 1, 2009, pp. 1-18.
Wolfram Alpha, "Making the World's Knowledge Computable", Wolfram Alpha LLC, www.wolframalpha.com, retrieved Apr. 16, 2014, pp. 1-2.
List of IBM Patents or Patent Applications Treated as Related, Nov. 10, 2014.

* cited by examiner

ENHANCING DATA CUBES

BACKGROUND

The present disclosure relates to the field of electronics, and specifically to the use of electronics in creating data cubes. Still more particularly, the present disclosure relates to enhancing data cubes in order to upgrade their ability to fulfill a user-specified need.

A data cube is a collection of data that can be commoditized. Thus, a data cube is a collection of data can be sold, bought, borrowed, leased, installed, loaded, and/or otherwise used for one or more purposes.

SUMMARY

In an embodiment of the present invention, a data server comprises: a request receiver for receiving multiple requests for data cubes that include data related to a user-specified subject matter; a request aggregator for aggregating the multiple requests into an aggregated request; a data cube retrieving device for retrieving an initial data cube that is related to the user-specified subject matter; a determination logic for determining that the initial data cube fails to provide data related to the user-specified subject matter beyond a predetermined value due to one or more sets of data being missing from the initial data cube; a first price setting logic for establishing a first price of the initial data cube based on said determining that the initial data cube fails to provide data related to the user-specified subject matter beyond the predetermined value due to one or more sets of data being missing from the initial data cube; a locating logic for locating the one or more sets of data that are absent from the initial data cube; a second price setting logic for establishing a second price for each of the one or more sets of data according to a level that each of the one or more sets of data causes the initial data cube to approach the predetermined value; a data cube provider for providing the initial data cube and the one or more sets of data to senders of the multiple requests for data cubes; a new request receiver for receiving, from a new requester, a new request for a data cube that provides data related to the user-specified subject matter; and an option provider logic for providing the new requester an option to purchase the initial data cube at the first price and one or more of the sets of data at the second price.

In an embodiment of the present invention, a method of enhancing a data cube comprises: receiving, by a data server, multiple requests for data cubes that include data related to a user-specified subject matter; aggregating, by the data server, the multiple requests into an aggregated request; retrieving, by the data server, an initial data cube that is related to the user-specified subject matter; determining, by the data server, that the initial data cube fails to provide data related to the user-specified subject matter beyond a predetermined value due to one or more sets of data being missing from the initial data cube; establishing, by the data server, a first price of the initial data cube; locating, by the data server, the one or more sets of data that are absent from the initial data cube; establishing, by the data server, a second price for each of the one or more sets of data according to a level that each of the one or more sets of data causes the initial data cube to approach the predetermined value; providing, by the data server, the initial data cube and the one or more sets of data to senders of the multiple requests for data cubes; receiving, by the data server, a new request, from a new requester, for a data cube that provides data related to the user-specified subject matter; and providing, by the data server, the new requester an option to purchase the initial data cube at the first price and one or more of the sets of data at the second price.

In an embodiment of the present invention, a computer program product enhances a data cube. The computer program product comprises a computer readable storage medium having program code embodied therewith, wherein the computer readable storage medium is not a transitory signal per se, and wherein the program code is readable and executable by a processor to perform a method comprising: receiving multiple requests for data cubes that include data related to a user-specified subject matter; aggregating the multiple requests into an aggregated request; retrieving an initial data cube that is related to the user-specified subject matter; determining that the initial data cube fails to provide data related to the user-specified subject matter beyond a predetermined value due to one or more sets of data being missing from the initial data cube; establishing a first price of the initial data cube; locating the one or more sets of data that are absent from the initial data cube; establishing a second price for each of the one or more sets of data according to a level that each of the one or more sets of data causes the initial data cube to approach the predetermined value; providing the initial data cube and the one or more sets of data to senders of the multiple requests for data cubes; receiving a new request, from a new requester, for a data cube that provides data related to the user-specified subject matter; and providing the new requester an option to purchase the initial data cube at the first price and one or more of the sets of data at the second price.

DETAILED DESCRIPTION

Figure 1:
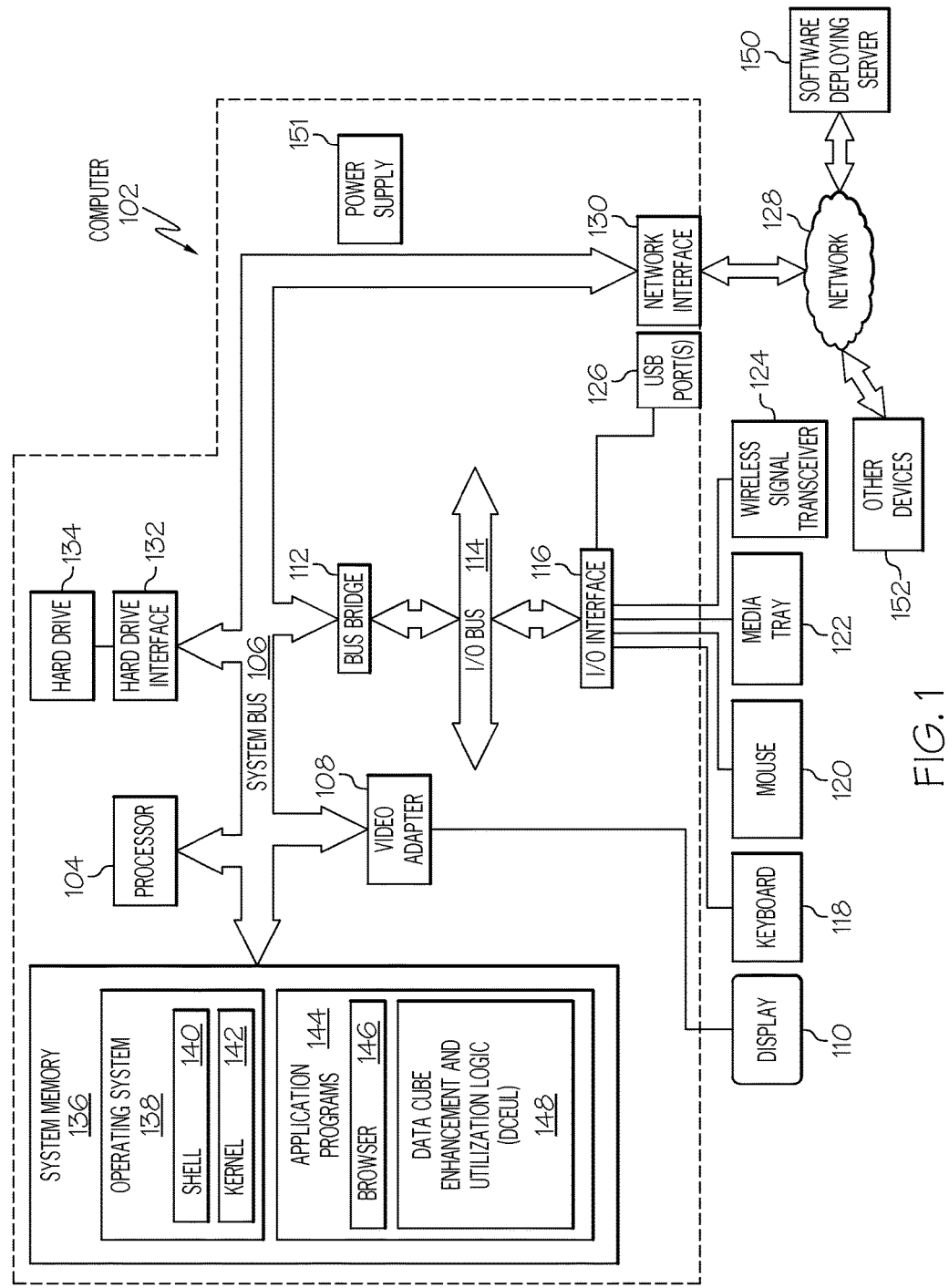
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or other device(s) 152, as well as data server 202, requesting device(s) 208, augmentation data server 210, and/or electronic device(s) 206 shown in FIG. 2.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a wireless signal transceiver 124 (e.g., a near field radio frequency transceiver, a Wi-Fi transceiver, etc.), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Data Cube Enhancement and Utilization Logic (DCEUL) 148. DCEUL 148 includes code for implementing the processes described below, including those described in FIGS. 2-3. In one embodiment, computer 102 is able to download DCEUL 148 from software deploying server 150, including in an on-demand basis, wherein the code in DCEUL 148 is not downloaded until needed for execution. Note further that, in one embodiment of the present invention, software deploying server 150 performs all of the functions associated with the present invention (including execution of DCEUL 148), thus freeing computer 102 from having to use its own internal computing resources to execute DCEUL 148.

Note that computer 102 is connected to a power supply 151 used to power various components within computer 102 and/or connected components (e.g., elements 110, 118, 126, 128, etc.) In various embodiments, power supply 151 may be a solar cell, a battery (rechargeable or non-rechargeable), a public utility power grid that is accessible via a wall socket, a local limited supply source (e.g., a local fuel-powered generator), etc.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
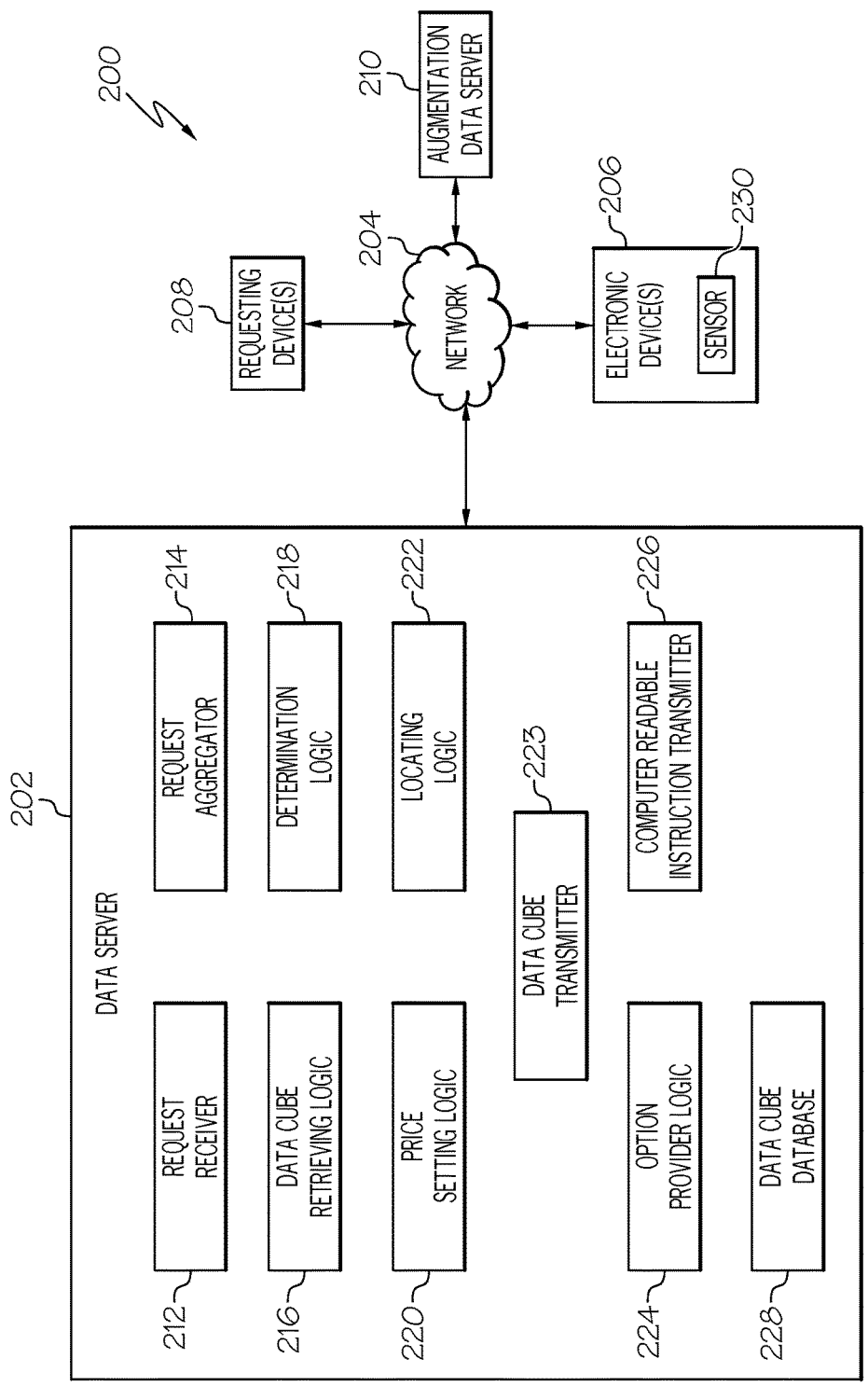
FIG. 2 illustrates an exemplary system in which the present invention may be utilized.

With reference now to FIG. 2, a system 200 in which the present invention may be implemented in one or more embodiments is presented. A data server 202 provides data cubes and/or augmentation data to requesters. A data cube is defined as a commoditized (available for sale, lease, borrow, etc.) collection of data. Augmentation data is defined as supplemental data that supplements a data cube, in order to provide requisite data for addressing a user-specific subject matter.

In one or more embodiments of the present invention, data server 202 is communicatively coupled to requesting device(s) 208, an augmentation data server 210, and/or electronic device(s) 206. In an embodiment of the present invention, this communicative coupling is via a network 204, which may be wireless (e.g., a cellular phone network), wired (e.g., the Internet), and/or a combination of wired/wireless networks.

A request receiver 212 is able to receive multiple requests (e.g., from requesting device(s) 208, such as client computers, tablet computers, smart phones, etc.) for data cubes that include data related to a user-specified subject matter. In an embodiment of the present invention, the request receiver 212 utilizes specifically configured hardware tailored for receiving such requests. For example, in an embodiment, the request receiver 212 includes a voltage detector, utilizing any digital voltage detector known to those skilled in the art of voltage detection. In an embodiment of the present invention, a request for a data cube is transmitted at a predetermined voltage (e.g., over 5.0 $V_{DC}$). Thus, any message received by the request receiver 212 over 5.0 $V_{DC}$ is deemed by the request receiver 212 to specifically be for a data cube.

A request aggregator 214 aggregates the multiple requests into an aggregated request. Request aggregator 214 includes hardware and software logic that examines data and/or metadata within the requests. For example, if the requests include a phrase "I need a data cube related to controlling an HVAC system", or even the term "HVAC", all requests that include such phrases/terms are consolidated into an aggregated request. Note that the requests may all be the same (requesting the exact same type of information), and thus the aggregated request is merely representative of any of the requests. However, in another embodiment, the requests are disparate (e.g., asking for different types, levels, etc., of data), such that the aggregated request is a hybrid of the different requests. For example, one of the requests may be for "Music survey data for listener preferences", while another request may be directed to "Data for controlling an audio amplifier for playing music". Both requests are related to "music", but are for different purposes. That is, the first request ("Music survey data for listener preferences") may be directed to creating a playlist, while the second request ("Data for controlling an audio amplifier for playing music") may be directed to controlling the volume of a disk jockey (DJ) audio system. Combining the two requests together into an aggregated request thus provides a request for both the playlist (e.g., from the first request) and power controls for the DJ audio system (from the second request).

A data cube retrieving logic 216 retrieves an initial data cube that is related to the aggregated request and the user-specified subject matter. Data cube retrieving logic 216 examines the subject matter that is found at a fine granular level (e.g., listener preferences, audio amplifier controls, etc.) in the aggregated request, as well as at a coarse granular level (e.g., "music"). Data cube retrieving logic 216 extracts this fine/coarse data from the requests using software that identifies and extracts the information from the requests using data analytics, such as comparing terms/phrases with known terms/phrases, to determine the content of the requests and the user-specified subject matter. The appropriate initial data cube is then retrieved, e.g., from a data cube database 228 within the data server 202.

A determination logic 218 determines that the initial data cube fails to provide data related to the user-specified subject matter beyond a predetermined value due to one or more sets of data being missing from the initial data cube. In an embodiment of the present invention, this determination is made by determination logic 218 examining feedback results of the initial data cube being sent to requesters. For example, assume that the initial data cube was sent to 100 requesters, each of which had requests related to "music". However, feedback (e.g., from a survey, data mining of customer e-mails, etc.) reveals that the initial data cube was deemed unacceptable (i.e., failed to provide data related to the user-specified subject matter beyond a predetermined value). Continuing with the present example, assume further that the initial data cube failed to provide any information about correlating certain songs with certain volume levels, which may be deemed important to a DJ.

Determining the "predetermined value" and whether or not the initial data cube meets this level may be accomplished in various ways. In an embodiment of the present invention, the missing data is simply a percentage of data (or data type) that the customer expected/needed from the initial data cube. Thus, if the initial data cube had data on 1) playlists and 2) general volume control, but no data on 3) correlating specific songs to specific volume levels, then only 2 out of 3 (66%) needed types of data are found in the initial data cube, which is below a predefined level of a value such as 95%.

Similarly, the "predetermined value" may be based on the quantity of data itself. For example, if the playlist data had only 100 songs, and the DJ wanted 1000 songs, then only 10% of expected songs are provided, which is unacceptable to the DJ, even if he/she were willing to accept only 800 songs (such that 80% is the predetermined value that must be met in order for the initial data cube to be acceptable).

A price setting logic 220 then establishes a first price of the initial data cube based on whether or not the initial data cube fails to provide data related to the user-specified subject matter beyond the predetermined value due to one or more sets of data being missing from the initial data cube. That is, assume that the initial data cube was missing 20% of the data that the requester(s) required. Based on this failure to provide all needed data, the price of the initial data cube is adjusted downward accordingly, using any known algorithm for adjusting data prices according to market pressures. For example, if music data cubes that have only 80% of the requisite data for a certain subject matter (e.g., DJ playlists), an examination of pasts markets may reveal that such playlists are worth only 50% of what a full playlist sells for.

In order to augment the initial data cube, and thus its value, a locating logic 222 will locate the one or more sets of data that are absent from the initial data cube. Locating logic 222 may be a web crawler, a database crawler, or any other hardware/software logic that is able to locate and retrieve data according to certain predefined parameters (e.g., songs for a playlist for a particular music genre, but which are not found in the initial data cube). This data may be retrieved from an augmentation data server 210, which supports websites, databases, etc.

A data cube provider (e.g., a data cube transmitter 223) then provides (transmits) the initial data cube and the one or more sets of data to senders of the multiple requests for data cubes, either before or after a second price setting logic (e.g., price setting logic 220 or another price setting logic—not shown) establishes a second price for each of the one or more sets of data according to a level that each of the one or more sets of data causes the initial data cube to approach the predetermined value. That is, the price setting logic 220 evaluates how effective the augmentation data (from the "one or more sets of data") has been in upgrading the initial data cube for meeting the needs of the requesters.

A new request receiver (e.g., request receiver 212 how receiving a new request) receives, from a new requester, a new request for a data cube that provides data related to the user-specified subject matter. This new request is for the user-specified subject matter, and thus might have been responded to with the initial data cube described above. However, since it is now determined that the initial data cube will be inadequate for the needs of the requester (according to the user-specified subject matter), then, an option provider logic 224 will provide the new requester an option to purchase not only the initial data cube at the first price, but also one or more of the sets of data (i.e., the augmentation data) at the second price set above.

In an embodiment of the present invention, assume that the new requester has elected to purchase both the initial data cube and one or more of the sets of (augmentation) data. A computer readable instruction transmitter 226 will then transmit computer readable instructions to install the initial data cube and one or more of the sets of data into an electronic device that has been predetermined to be related to the user-specified subject matter, wherein installing the initial data cube and one or more of the sets of data improves a functioning of the electronic device by modifying an operation of the electronic device. That is, the enhanced data cube (made up of the initial data cube plus the augmentation data) is sent to an electronic device, such as one or more of the electronic device(s) 206. Installing the newly created enhanced data cube (i.e., the initial data cube plus the augmentation data) onto the electronic device will cause the electronic device to run at a greater optimization level.

For example, assume that the electronic device is an electric motor. Assume further that the electric motor has control logic that is controlled by a block of data (e.g., data that speeds up, slows down, turns on/off the motor according to loads on the electric motor, times of day, etc.). The initial data cube may include data, that when loaded into the control logic (i.e., a "controller"), will turn the electric motor off and on, but will not respond to various loads on the electric motor, times of the day, etc. Augmentation data may include historical data for that particular electric motor, or for similar and/or similarly deployed (i.e., within similar environments such as a chemical plant) for when the electric motor should be sped up, slowed down, etc. according to operational needs. Thus, the augmentation data includes code that, when loaded into the controller along with the initial data cube (together an "enhanced data cube"), will cause the electric motor to automatically respond to various loads, turn off/on and/or slow down/speed up at certain times of the day, etc., thus improving the operation of the electric motor.

In another embodiment of the present invention, the electronic device is an electronic sensor, which may be a light sensor, a chemical sensor, a microphone, etc. Assume for purposes of illustration that the sensor is a chemical sensor, which is programmable. That is, assume that the chemical sensor has multiple sensors that are specific for certain chemicals. By programming these multiple sensors in a certain pattern, then a specific substance can be identified. For example, assume that the chemical sensor has a sensor for chemical A, another sensor for chemical B, and another sensor for chemical C. Assume further that a specific substance includes chemical A and chemical C, but not chemical B. By programming the chemical sensor (using data from the enhanced data cube) to turn on the sensor for chemical A and chemical C, but turn off the sensor for chemical B, then the chemical sensor operates more efficiently, particularly when only looking for this specific substance. These directions are thus controlled by an enhanced data cube (made up of the initial data cube and the augmentation data), whose data may be historically based from other similar sensor systems, predictively based according to the structure of the sensor, etc.

In another embodiment of the present invention, the electronic device is an electronic pump. For example, assume that the electronic pump is programmable by data from the enhanced data cube, in order to turn at a certain speed, provide specific forces, operate at certain times, etc. By tailoring the programming of the electronic device (using the data from the enhanced data cube) to perform a certain function (e.g., pumping water rather than pumping heavier sludge), the operation of the electronic pump is improved.

In another embodiment of the present invention, the electronic device is an electronic controller for an air conditioning system. For example, assume that an electronic controller controls a heating, ventilation and air conditioning (HVAC) system in a building. If programmed with data from just the initial data cube, the electronic controller may cause the HVAC system to run continuously, thus wasting energy. However, by using data from the enhanced data cube (made up of the initial data cube plus data from the augmentation data), the electronic controller will now only turn the HVAC system off/on when certain rooms in the building are occupied, during certain times of the day, etc., thus making the HVAC more efficient.

In another embodiment of the present invention, the electronic device is an electronic controller for a lighting system. For example, assume that the lighting system is for lights throughout a building. If programmed with data from just the initial data cube, the electronic controller may cause the lights in the lighting system to remain on at all times, thus wasting energy. However, by using data from the enhanced data cube (made up of the initial data cube plus data from the augmentation data), the electronic controller will now only turn lights off/on when certain rooms in the building are occupied, during certain times of the day, etc., thus making the lighting system more efficient.

Figure 3:
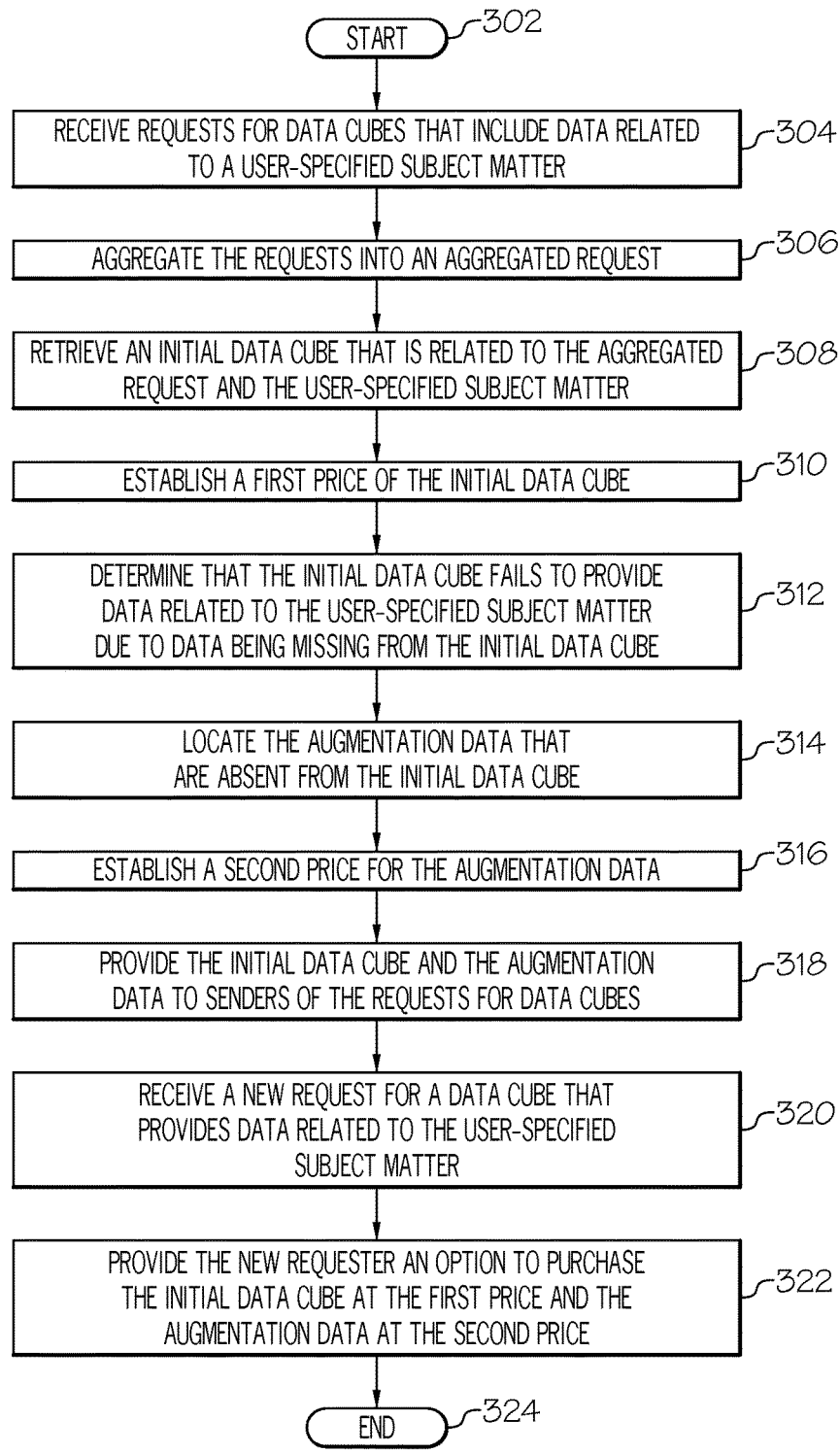
FIG. 3 is a high-level flowchart of one or more steps performed by one or more hardware devices to augment and/or utilize a data cube.

With respect now to FIG. 3, a high level flow chart of one or more steps performed by one or more hardware devices to enhance a data cube and/or use data from the enhanced data cube is presented.

After initiator block 302, a data server receives multiple requests for data cubes that include data related to a user-specified subject matter, as described in block 304. The user-specified subject matter is discussed above, and specifies a particular usage for the data being requested.

As described in block 306, the data server aggregates the multiple requests into an aggregated request, which includes specific requests for certain types of and/or purposes for the data (e.g., to control an HVAC system, to set a playlist, etc.).

As described in block 308, the data server retrieves an initial data cube that is related to the aggregated request and the user-specified subject matter. That is, the initial data cube provides data at both the fine granularity level (e.g., specific information regarding what the data is to be used for, as derived from the multiple data requests), as well as a coarse granularity level (e.g., as indicated by a common term/phrase found in all of the data requests).

As described in block 310, the data server establishes a first price of the initial data cube. Note that this first price is not arbitrary. Rather, the first price is set according to how well the initial data cube has performed in meeting the needs of previous requesters.

As described in block 312, the data server then provides the initial data cube to senders of the multiple requests for data cubes (at the first price), and then determines that the initial data cube fails to provide data related to the user-specified subject matter beyond a predetermined value due to one or more sets of data being missing from the initial data cube. That is, the missing data does not fully enable the process contemplated by the requester. In order to remedy this condition, the data server locates the one or more sets of data that are absent from the initial data cube (block 314), and then establishes a price for the augmentation data (block 316), and sends the initial data cube and the one or more sets of data to senders of the multiple requests for data cubes (block 318). In an embodiment of the present invention, the price for the augmentation data (i.e., for each of the one or more sets of data) is set according to a level that each of the one or more sets of data causes the initial data cube to approach the predetermined value. That is, if a certain set of augmentation data causes the initial data cube to meet 100% of the needs described by the aggregated request for data, then that set of augmentation data will cost the customer more than if it only met 80% of these needs.

As described in block 320, the data server receives a new request, from a new requester, for a data cube that provides data related to the user-specified subject matter. As described in block 322, the data server then provides the new requester an option to purchase the initial data cube at the first price and one or more of the sets of data at the second price. That is, in an embodiment of the present invention, the data server will offer a variety of data options to the requester, such that the more effective the data from the ordered data cube (including the augmentation data) is in meeting the needs of the buyer, the more costly it will be.

The flow-chart ends at terminator block 324.

In an embodiment of the present invention, the data server detects a reading from a sensor in an electronic device that has been predetermined to be related to the user-specified subject matter, wherein the reading identifies an anomaly in the electronic device that has been predetermined to be related to the user-specified subject matter. For example, assume that one of the electronic device(s) 206 in FIG. 2 has a sensor 230 attached to (or embedded within) it. Sensor 230 may detect vibration, heat, light, chemicals, water, etc. Assume for purposes of illustration that sensor 230 is a vibration sensor, and electronic device 206 is an electric motor. Thus, the user-specified subject matter is "operation of an electric motor", and the anomaly detected by the vibration sensor 230 is excessive (beyond a predefined limit)

vibration at the electric motor. Assume further that the data server has received a signal indicating that the new requester elects to purchase that initial data cube and one or more of the sets of data, which are deemed to resolve the excessive vibration issue (e.g., by slowing down the electric motor). The data server will then transmit computer readable instructions to install the initial data cube and one or more of the sets of data into the electronic device that has been predetermined to be related to the user-specified subject matter, wherein installing the initial data cube and one or more of the sets of data improves a functioning of the electronic device by modifying an operation of the electronic device. That is, the data server 202 in FIG. 2 will then send program instructions to the electronic device 206 (e.g., a controller that controls the electric motor) to install the data from the initial data cube and the augmentation data (which together make up the enhanced data cube) into the controller, thus ameliorating the excessive vibration. That is, the enhanced data cube provides data that instructs the controller to adjust the speed of the electric motor if vibration becomes excessive.

Similar modifications to a controller's operation occurs with the installation of the enhanced data cube in scenarios in which the electronic device is an electronic sensor (e.g., by adjusting the sensitivity of the electronic sensor); an electronic pump (e.g., by adjusting the speed/torque of the electronic pump); an electronic controller for an air conditioning system (described above); or an electronic controller for a lighting system (also described above).

Note that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A data server comprising:
a request receiver for receiving multiple requests for data cubes that include data related to a user-specified subject matter;
a request aggregator for aggregating the multiple requests into an aggregated request;
a data cube retrieving logic for retrieving an initial data cube that is related to the aggregated request and the user-specified subject matter;
a determination logic for determining that the initial data cube fails to provide data related to the user-specified subject matter beyond a predetermined value due to one or more sets of data being missing from the initial data cube;
a first price setting logic for establishing a first price of the initial data cube based on said determining that the initial data cube fails to provide data related to the user-specified subject matter beyond the predetermined value due to one or more sets of data being missing from the initial data cube;
a locating logic for locating the one or more sets of data that are absent from the initial data cube;
a second price setting logic for establishing a second price for each of the one or more sets of data according to a level that each of the one or more sets of data causes the initial data cube to approach the predetermined value;
a data cube provider for providing the initial data cube and the one or more sets of data to senders of the multiple requests for data cubes;
a new request receiver for receiving, from a new requester, a new request for a data cube that provides data related to the user-specified subject matter;
an option provider logic for providing the new requester an option to purchase the initial data cube at the first price and the one or more of the sets of data at the second price, wherein the new requester elects to purchase the initial data cube and the one or more of the sets of data, and wherein the data server further comprises a computer readable instruction transmitter for transmitting computer readable instructions to install the initial data cube and the one or more of the sets of data into an electronic device that has been predetermined to be related to the user-specified subject matter, wherein installing the initial data cube and the one or more of the sets of data improves a functioning of the electronic device by modifying an operation of the electronic device, and wherein the electronic device is one of a set of devices, the set of devices comprising (i) an electronic controller for an air conditioning system and (ii) an electronic controller for a lighting system.

2. The data server of claim 1, wherein the set of devices further comprises (iii) an electric motor.

3. The data server of claim 1, wherein the set of devices further comprises (iii) an electronic sensor.

4. The data server of claim 1, wherein the set of devices further comprises (iii) an electronic pump.

5. A method of enhancing a data cube, the method comprising:
receiving, by a data server, multiple requests for data cubes that include data related to a user-specified subject matter;
aggregating, by the data server, the multiple requests into an aggregated request;
retrieving, by the data server, an initial data cube that is related to the aggregated request and the user-specified subject matter;
establishing, by the data server, a first price of the initial data cube;
providing, by the data server, the initial data cube to senders of the multiple requests for data cubes;
determining, by the data server, that the initial data cube fails to provide data related to the user-specified subject matter beyond a predetermined value due to one or more sets of data being missing from the initial data cube;
locating, by the data server, the one or more sets of data that are absent from the initial data cube;
establishing, by the data server, a second price for each of the one or more sets of data according to a level that each of the one or more sets of data causes the initial data cube to approach the predetermined value;
providing, by the data server, the initial data cube and the one or more sets of data to the senders of the multiple requests for data cubes;
receiving, by the data server, a new request, from a new requester, for a data cube that provides data related to the user-specified subject matter;

providing, by the data server, the new requester an option to purchase the initial data cube at the first price and the one or more of the sets of data at the second price;

detecting, by the data server, a reading from a sensor in an electronic device that has been predetermined to be related to the user-specified subject matter, wherein the reading identifies an anomaly in the electronic device that has been predetermined to be related to the user-specified subject matter;

receiving, by the data server, a signal indicating that the new requester elects to purchase the initial data cube and the one or more of the sets of data; and transmitting computer readable instructions to install the initial data cube and the one or more of the sets of data into the electronic device that has been predetermined to be related to the user-specified subject matter, wherein installing the initial data cube and the one or more of the sets of data improves a functioning of the electronic device by modifying an operation of the electronic device, and wherein the electronic device is one of a set of devices, the set of devices comprising (i) an electronic controller for an air conditioning system and (ii) an electronic controller for a lighting system.

6. The method of claim 5, wherein the set of devices further comprises (iii) an electric motor.

7. The method of claim 5, wherein the set of devices further comprises (iii) an electronic sensor.

8. The method of claim 5, wherein the set of devices further comprises (iii) an electronic pump.

9. A computer program product for enhancing a data cube, the computer program product comprising a computer readable storage medium having program code embodied therewith, wherein the computer readable storage medium is not a transitory signal per se, and wherein the program code is readable and executable by a processor to perform a method comprising:

receiving multiple requests for data cubes that include data related to a user-specified subject matter;

aggregating the multiple requests into an aggregated request;

retrieving an initial data cube that is related to the aggregated request and the user-specified subject matter;

establishing a first price of the initial data cube;

providing the initial data cube to senders of the multiple requests for data cubes;

determining that the initial data cube fails to provide data related to the user-specified subject matter beyond a predetermined value due to one or more sets of data being missing from the initial data cube;

locating the one or more sets of data that are absent from the initial data cube;

establishing a second price for each of the one or more sets of data according to a level that each of the one or more sets of data causes the initial data cube to approach the predetermined value;

providing the initial data cube and the one or more sets of data to the senders of the multiple requests for data cubes;

receiving a new request, from a new requester, for a data cube that provides data related to the user-specified subject matter;

providing the new requester an option to purchase the initial data cube at the first price and the one or more of the sets of data at the second price;

detecting a reading from a sensor in an electronic device that has been predetermined to be related to the user-specified subject matter, wherein the reading identifies an anomaly in the electronic device that has been predetermined to be related to the user-specified subject matter;

receiving a signal indicating that the new requester elects to purchase the initial data cube and the one or more of the sets of data; and transmitting computer readable instructions to install the initial data cube and the one or more of the sets of data into the electronic device that has been predetermined to be related to the user-specified subject matter, wherein installing the initial data cube and the one or more of the sets of data improves a functioning of the electronic device by modifying an operation of the electronic device, and wherein the electronic device is one of a set of devices, the set of devices comprising (i) an electronic controller for an air conditioning system and (ii) an electronic controller for a lighting system.

10. The computer program product of claim 9, wherein the set of devices further comprises (iii) an electric motor.

11. The computer program product of claim 9, wherein the set of devices further comprises (iii) an electronic sensor.

12. The computer program product of claim 9, wherein the set of devices further comprises (iii) an electronic pump.

* * * * *